United States Patent [19]

Nagashima

[11] Patent Number: 4,552,105
[45] Date of Patent: Nov. 12, 1985

[54] FUEL PIPE JOINT

[75] Inventor: Akira Nagashima, Kawasaki, Japan

[73] Assignee: Kioritz Corporation, Tokyo, Japan

[21] Appl. No.: 646,928

[22] Filed: Sep. 4, 1984

[30] Foreign Application Priority Data

Sep. 9, 1983 [JP] Japan .......................... 58-139810[U]

[51] Int. Cl.$^4$ .............................................. F02B 77/08
[52] U.S. Cl. ................. 123/198 R; 116/276; 222/159
[58] Field of Search ............... 123/198 A, 25 E, 25 C, 123/25 A, 198 R, DIG. 3; 116/276; 222/159, 40

[56] References Cited

U.S. PATENT DOCUMENTS

| | | | |
|---|---|---|---|
| 2,046,668 | 7/1936 | Wixson | 116/276 |
| 2,240,458 | 4/1941 | Grise | 222/159 |
| 2,329,728 | 9/1943 | Samiran | 222/159 |
| 2,644,440 | 7/1953 | Bailey | 123/198 A |
| 2,791,197 | 5/1957 | Wylie | 116/276 |
| 2,842,089 | 7/1958 | Midkiff | 116/276 |
| 2,972,342 | 2/1961 | Owen | 222/159 |
| 3,068,961 | 12/1962 | Stihl et al. | |
| 3,296,854 | 1/1967 | Morgan | 116/276 |
| 3,332,411 | 7/1967 | Bloom et al. | |
| 3,338,564 | 8/1967 | Roeder | 123/198 A |
| 3,865,213 | 2/1975 | McDermott | |
| 4,286,632 | 9/1981 | Abel | 222/159 |

FOREIGN PATENT DOCUMENTS 539217 4/1957 Canada .................. 116/276

Primary Examiner—Ira S. Lazarus
Attorney, Agent, or Firm—Karl W. Flocks; Sheridan Neimark; A. Fred Starobin

[57] ABSTRACT

A fuel pipe joint for connecting fuel pipes through which fuel is supplied from a fuel tank to an internal combustion engine mounted on a portable power-driven machine such as a chain saw. The fuel pipe joint has a main body made of a transparent synthetic resinous material and mounted on an upper portion of the fuel tank. The main body is equipped with a first pipe connector portion projected from the lower side of the main body into the tank and connected to a fuel pipe for sucking the fuel from the fuel tank, a second pipe connector portion projected from one side of the main body and connected to another fuel pipe leading to the internal combustion engine, and a fuel passage formed in the main body and providing a communication between the first and second pipe connector portions. The user can visually confirm the proper supply of the fuel, especially in starting up the engine.

1 Claim, 1 Drawing Figure

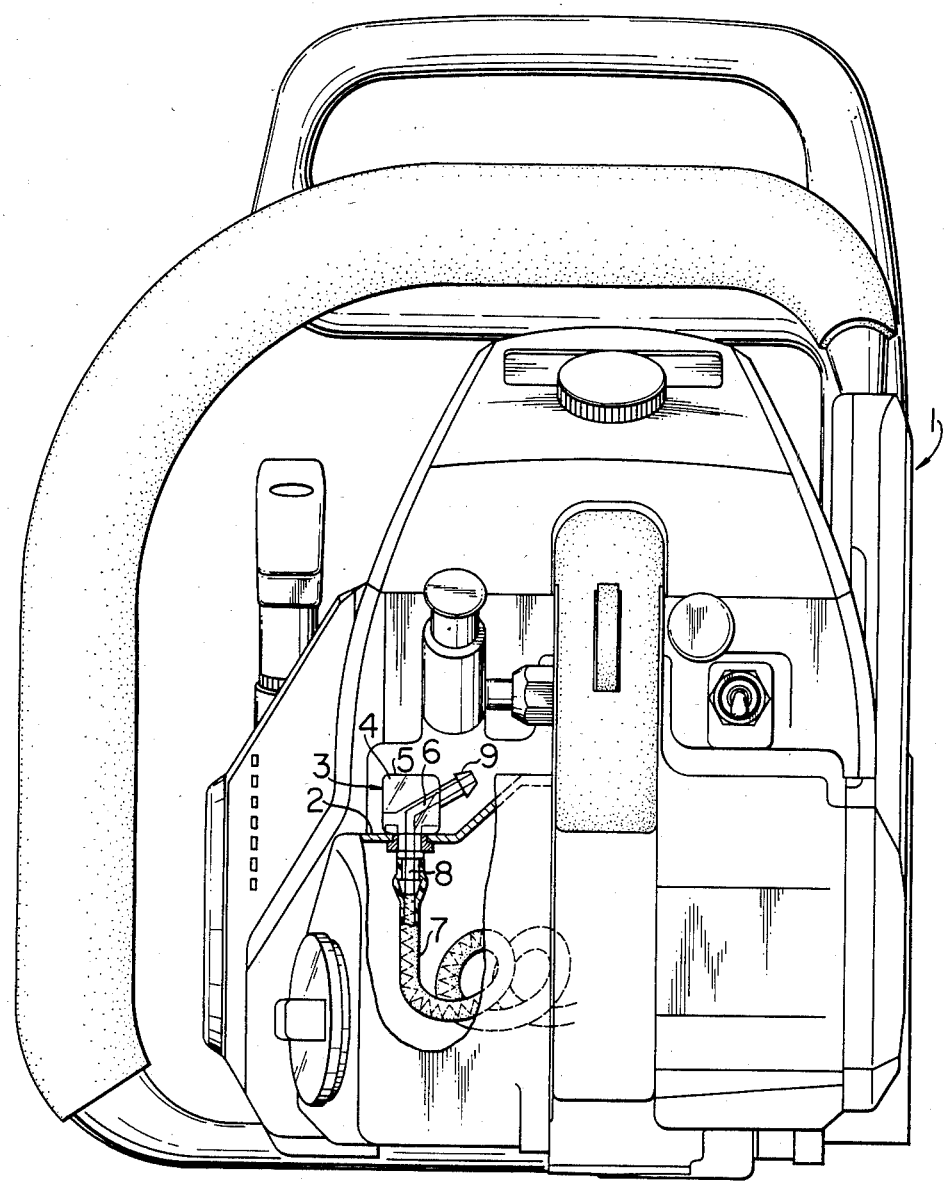

FUEL PIPE JOINT

BACKGROUND OF THE INVENTION

The present invention relates to a fuel pipe joint for jointing fuel pipes through which fuel is supplied from a fuel tank to an internal combustion engine.

More particularly, the invention is concerned with a fuel pipe joint for use in the fuel supply systems of portable power-driven machines such as chain saws, grass trimmers and so forth.

Generally, in the portable power-driven machines of the kind mentioned above, it is difficult for the user to confirm the proper supply of the fuel to the engine, especially during the starting up of the engine. Hitherto, therefore, it has been necessary to provide a specific device to enable the user to confirm the proper supply of the fuel.

SUMMARY OF THE INVENTION

Accordingly, an object of the invention is to provide a fuel pipe joint having a simple construction and capable of enabling the user to confirm the supply of fuel to the engine through a visual check of the flow of fuel, without necessitating any specific additional part, thereby overcoming the above-described problems of the prior art.

To this end, according to the invention, there is provided a fuel pipe joint for connecting fuel pipes through which fuel is supplied from a fuel tank to an internal combustion engine, the fuel pipe joint comprising: a main body made of a transparent synthetic resinous material and mounted on an upper portion of the fuel tank, the main body having a first pipe connector portion projected from the lower side of the main body into the tank and connected to a fuel pipe for sucking the fuel from the fuel tank, a second pipe connector portion projected from one side of the main body and connected to a fuel pipe leading to the internal combustion engine, and a fuel passage formed in the main body and providing a communication between the first and second pipe connector portions.

According to the invention, therefore, the user can visually check the flow of fuel in the fuel passage through the transparent main body of the fuel pipe joint, so that he can confirm the proper supply of the fuel to the engine before he starts the engine. This remarkable effect can be attained by quite a simple, small-sized and light-weight construction, without necessitating any additional part.

The above and other objects, features and advantages of the invention will become clear from the following description of the preferred embodiment when the same is read in conjunction with the accompanying drawing.

BRIEF DESCRIPTION OF THE DRAWING

The attached sole FIGURE is a partly-sectioned rear elevational view of a chain saw incorporating a fuel pipe joint of the invention.

DESCRIPTION OF THE PREFERRED EMBODIMENT

The invention will be described hereinunder with reference to the accompanying drawing.

Referring to the attached sole FIGURE, a chain saw generally denoted by a numeral 1 has an internal combustion engine (not shown) and a fuel tank 2 from which fuel is supplied to the engine. A fuel pipe joint 3 of the invention, made of a transparent synthetic resinous material, is attached to such a portion of the tank 2 that the user can easily observe the fuel pipe joint 3 visually.

The fuel pipe joint 3 has a main body 4 having a shape of a hexahedron. The main body 4 has a flattened top surface 5. A fuel passage 6 is formed in the mainbody 4 through, for example, the flattened top surface 5 in such a manner that the user can visually observe the inside of the fuel passage 6. The fuel pipe joint 3 further has a first pipe connector portion 8 projected into the fuel tank 2 and connected to one end of a flexible fuel pipe 7 and a second pipe connector portion 9 which is projected from one lateral side of the main body 4 and connected to another fuel pipe (not shown) which is connected to the fuel inlet of a carburetor (not shown) attached to the engine. The aforementioned fuel passage 6 is formed in the main body 4 so as to provide a communication between the first and second pipe connector portions 8 and 9. The flexible fuel pipe 7 extends into the fuel tank 2 and is provided at its other end with a filter (not shown) which is immersed in the fuel stored in the fuel tank 2.

As the engine is started, the fuel in the fuel tank 2 is sucked through the fuel filter attached to the other end of the flexible fuel pipe 7 and is introduced to the first pipe connector portion 8 of the fuel pipe joint 3 through the flexible fuel pipe 7. The fuel then flows through the fuel passage 6 formed in the main body 4 to reach the second pipe connector portion 9 and is supplied to the carburetor of the engine through another fuel pipe which is omitted from the drawing.

Meanwhile, the user can visually check the flow of the fuel in the fuel passage 6 through the transparent walls of the main body 4 and, hence, can confirm the proper supply of the fuel to the engine.

Although the invention has been described through specific terms, it is to be noted here that the described embodiment is not exclusive and various changes and modifications may be imparted thereto without departing from the scope of the invention which is limited solely by the appended claim.

What is claimed is:

1. A fuel pipe joint for connecting fuel pipes through which fuel is supplied from a fuel tank to an internal combustion engine, said fuel pipe joint comprising: a main body made of a transparent synthetic resinous material and mounted directly on an upper portion of said fuel tank, said main body having solidly a first pipe connector portion projected from the lower side of said main body into said tank and connected to a fuel pipe for sucking the fuel from said fuel tank, a second pipe connector portion projected from one side of said main body and connected to another fuel pipe leading to said internal combustion engine, and a fuel passage formed in said main body and providing a communication between said first and second pipe connector portions.

* * * * *